(12) United States Patent
Maruyama et al.

(10) Patent No.: US 8,488,155 B2
(45) Date of Patent: Jul. 16, 2013

(54) DOCUMENT READING DEVICE, AND IMAGE TRANSMITTING APPARATUS AND IMAGE FORMING APPARATUS INCLUDING DOCUMENT READING DEVICE

(75) Inventors: Miyoko Maruyama, Osaka (JP); Takeshi Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 827 days.

(21) Appl. No.: 12/496,911

(22) Filed: Jul. 2, 2009

(65) Prior Publication Data
US 2010/0002259 A1    Jan. 7, 2010

(30) Foreign Application Priority Data

Jul. 7, 2008 (JP) ................................. 2008-177190

(51) Int. Cl.
*G06F 15/00* (2006.01)
*G06K 1/00* (2006.01)

(52) U.S. Cl.
USPC ........... 358/1.15; 358/1.1; 358/1.9; 358/1.13; 358/1.14

(58) Field of Classification Search
None
See application file for complete search history.

(56) References Cited

U.S. PATENT DOCUMENTS

| | | | |
|---|---|---|---|
| 5,652,663 A * | 7/1997 | Zelten | 358/447 |
| 6,233,057 B1 | 5/2001 | Ota | |
| 6,856,423 B2 | 2/2005 | Anderson et al. | |
| 6,912,062 B2 | 6/2005 | Kihara | |
| 8,125,693 B2 * | 2/2012 | Arai | 358/462 |
| 2005/0190382 A1 * | 9/2005 | van Os | 358/1.1 |
| 2006/0215231 A1 | 9/2006 | Borrey et al. | |
| 2007/0041530 A1 * | 2/2007 | Tanimoto et al. | 379/93.24 |
| 2007/0211296 A1 * | 9/2007 | Toda | 358/1.18 |
| 2009/0033964 A1 | 2/2009 | Kubota | |
| 2010/0053682 A1 | 3/2010 | Gotoh et al. | |

FOREIGN PATENT DOCUMENTS

| | | |
|---|---|---|
| CN | 101069414 | 11/2007 |
| JP | 05-276306 | 10/1993 |
| JP | 08-340447 | 12/1996 |
| JP | 11-284846 | 10/1999 |
| JP | 2001-313664 | 11/2001 |
| JP | 2002-077606 | 3/2002 |
| JP | 2002-116665 | 4/2002 |
| JP | 2004-096245 | 3/2004 |
| JP | 2004-235680 | 8/2004 |
| JP | 2004-282439 | 10/2004 |
| JP | 2006-180343 | 7/2006 |

OTHER PUBLICATIONS

Office Action for U.S. Appl. No. 12/583,803 (Jun. 6, 2012).

* cited by examiner

*Primary Examiner* — Thierry Pham
(74) *Attorney, Agent, or Firm* — Edwards Wildman Palmer LLP; David G. Conlin; Steven M. Jensen

(57) ABSTRACT

A document reading device is provided that may perform preview display to enable read contents to be checked if it is determined that a blank sheet exists among read document images. This document reading device includes a document reading portion, a blank-sheet determining portion that determines blank-sheet image data among document image data read by the document reading portion, and a preview displaying portion that performs preview display for image data excluding the blank-sheet image data determined by the blank-sheet determining portion, and the preview displaying portion is capable of performing re-preview display of all the image data read by the document reading portion for the image data excluding the blank-sheet image data displayed in the preview display.

9 Claims, 12 Drawing Sheets

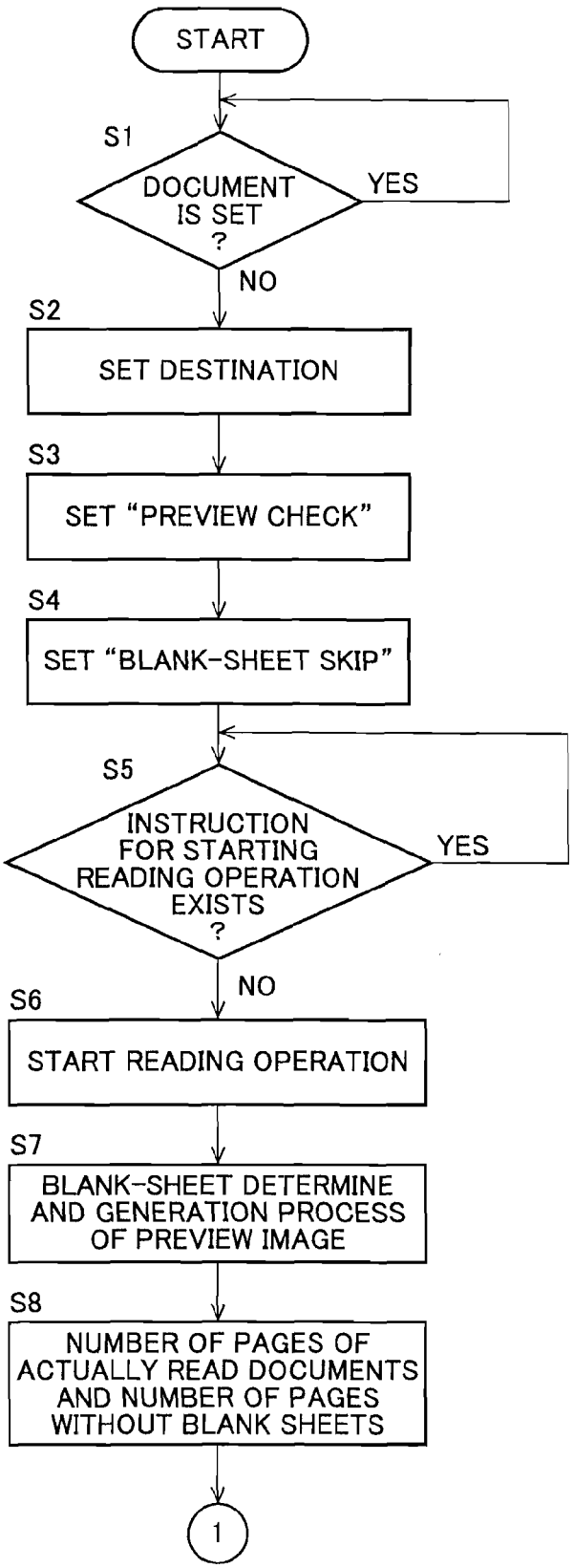

DOCUMENT READING DEVICE, AND IMAGE TRANSMITTING APPARATUS AND IMAGE FORMING APPARATUS INCLUDING DOCUMENT READING DEVICE

CROSS-NOTING PARAGRAPH

This non-provisional application claims priority under 35 U.S.C. §119 (a) on Patent Application No. 2008-177190 filed in JAPAN on Jul. 7, 2008, the entire contents of which are hereby incorporated herein by reference.

FIELD OF THE INVENTION

The present invention relates to a document reading device capable of removing a read blank sheet, and an image transmitting apparatus and an image forming apparatus including the document reading device.

BACKGROUND OF THE INVENTION

Image forming apparatuses capable of sequentially carrying and reading a plurality of documents set in an automatic document carrying device are conventionally known.

These image forming apparatuses recently achieve multi-functionality through digitalization and systematization and more complex functions are achieved through connection to a network.

If a one-sided document is set upside down or a blank sheet is mixed in and set in such an image forming apparatus, a blank sheet is copied or transmitted.

Japanese Laid-Open Patent Publication No. 2001-313664 discloses that a user is urged to preview a created image to check whether document contents are reproduced before facsimile transmission.

Japanese Laid-Open Patent Publication No. 2002-116665 discloses that if a blank page exists among read documents, the presence of a blank page is reported and the reported page is read again before copying or transmission is performed.

However, if a created image is different, rereading must be performed until a correct image is acquired in the case of Japanese Laid-Open Patent Publication No. 2001-313664.

The presence of a blank page is reported after reading documents and a user must take out the page to check whether this page is set by mistake or originally a blank page or erroneously judged as a blank page in the case of Japanese Laid-Open Patent Publication No. 2002-116665.

SUMMARY OF THE INVENTION

It is the object of the present invention to provide a document reading device capable of performing preview display to allow a user to check the read contents if it is determined that a blank sheet exists among read document images before executing an output process of the read document images, and an image transmitting apparatus and an image forming apparatus including the document reading device.

A document reading device of the present invention comprises a document reading portion; a blank-sheet determining portion that determines blank-sheet image data among document image data read by the document reading portion; and a preview displaying portion that performs preview display for image data excluding the blank-sheet image data determined by the blank-sheet determining portion, the preview displaying portion being capable of performing re-preview display of all the image data read by the document reading portion for the image data excluding the blank-sheet image data displayed in the preview display.

For more detail, the above document reading device has any one of features which follow.

(1) A document reading device sequentially reading and recording documents and having a blank-sheet determining portion that determines image data of a blank sheet among read document image data, comprising:
a blank-sheet skipping portion that determines whether each of the sequentially read document image data is blank-sheet image data to correlate and store the document image data with the determination result in accordance with a blank-sheet skip instruction, and performs preview display for the document image data determined as nonblank-sheet image data after all the document images are read;
a blank-sheet skip canceling portion that performs preview display of all the read document image data in accordance with cancellation of the blank-sheet skip instruction; and
an output portion that skips the document image data determined as blank-sheet image data to output the read document image data if the blank-sheet skip instruction is effective, and outputs all the read document image data if the blank-sheet skip canceling instruction is effective.

(2) A document reading device sequentially reading and recording documents and having a blank-sheet determining portion that determines image data of a blank sheet among read document image data, comprising:
a blank-sheet skipping portion that determines whether each of the sequentially read document image data is blank-sheet image data to correlate and store the document image data with the determination result in accordance with a blank-sheet skip instruction, and performs preview display for the document image data determined as blank-sheet image data after all the document images are read;
a blank-sheet skip canceling portion that performs preview display of all the read document image data in accordance with cancellation of the blank-sheet skip instruction; and
an output portion that skips the document image data determined as blank-sheet image data to output the read document image data if the blank-sheet skip instruction is effective, and outputs all the read document image data if the blank-sheet skip canceling instruction is effective.

(3) A document reading device sequentially reading and recording documents and having a blank-sheet determining portion that determines image data of the backside of document showed through among read document image data, comprising:
a show-through document skipping portion that determines whether each of the sequentially read document image data is the image data of the backside of document showed through to correlate and store the document image data with the determination result in accordance with a show-through document skip instruction, and performs preview display for the document image data determined as image data without the backside of document showed through after all the document images are read;
a show-through document skip canceling portion that performs preview display of all the read document image data in accordance with cancellation of the show-through document skip instruction; and
an output portion that skips the document image data determined as image data of the backside of document showed through to output the read document image data if the show-through document skip instruction is effective, and outputs all the read document image data if the show-through document skip canceling instruction is effective.

The document reading device includes a notifying portion that after all the document images are read, displays:

(1) the number of document image data determined as nonblank sheets;

(2) the number of all the read document image data and the number of document image data determined as nonblank-sheet image data; and (3) an alert message without performing the preview display if all the document image data are determined as blank-sheet image data.

The above display of the page numbers is terminated in a predetermined time period and if a predetermined time has elapsed, a subsequent process is canceled.

Among all the read document image data displayed in the preview display, document image data instructed to be deleted may be deleted from the read document image data to be output.

A show-through determining portion may be included to determine whether read document image data is image data of the backside of document showed through a blank sheet, and the image data of the backside of document showed through determined by the show-through determining portion may be processed as the blank-sheet image data.

The above document reading device may be included along with a transmitting portion transmitting the document image read by the document reading device through the facsimile transmission or as an e-mail to make up an image transmitting apparatus or the above document reading device may be included along with a printing portion printing the document image read by the document reading device to make up an image forming apparatus.

BRIEF DESCRIPTION OF THE DRAWINGS

FIGS. 4A and 4B are explanatory flowcharts of a process procedure from reading to transmission of documents, taking facsimile transmission as an example;

PREFERRED EMBODIMENTS OF THE INVENTION

Preferred embodiments of the present invention will now be described with reference to the drawings.

Although the preferred embodiments of the present invention will hereinafter be described as an digital multi-function peripheral having a print function, a copy function, a scan function, a facsimile transmission/reception function, etc., the embodiments are applicable to a document reading device capable of automatically and sequentially reading a plurality of documents, an image transmitting apparatus, and an image forming apparatus.

<First Embodiment>

(A) Overall Configuration

Figure 1:
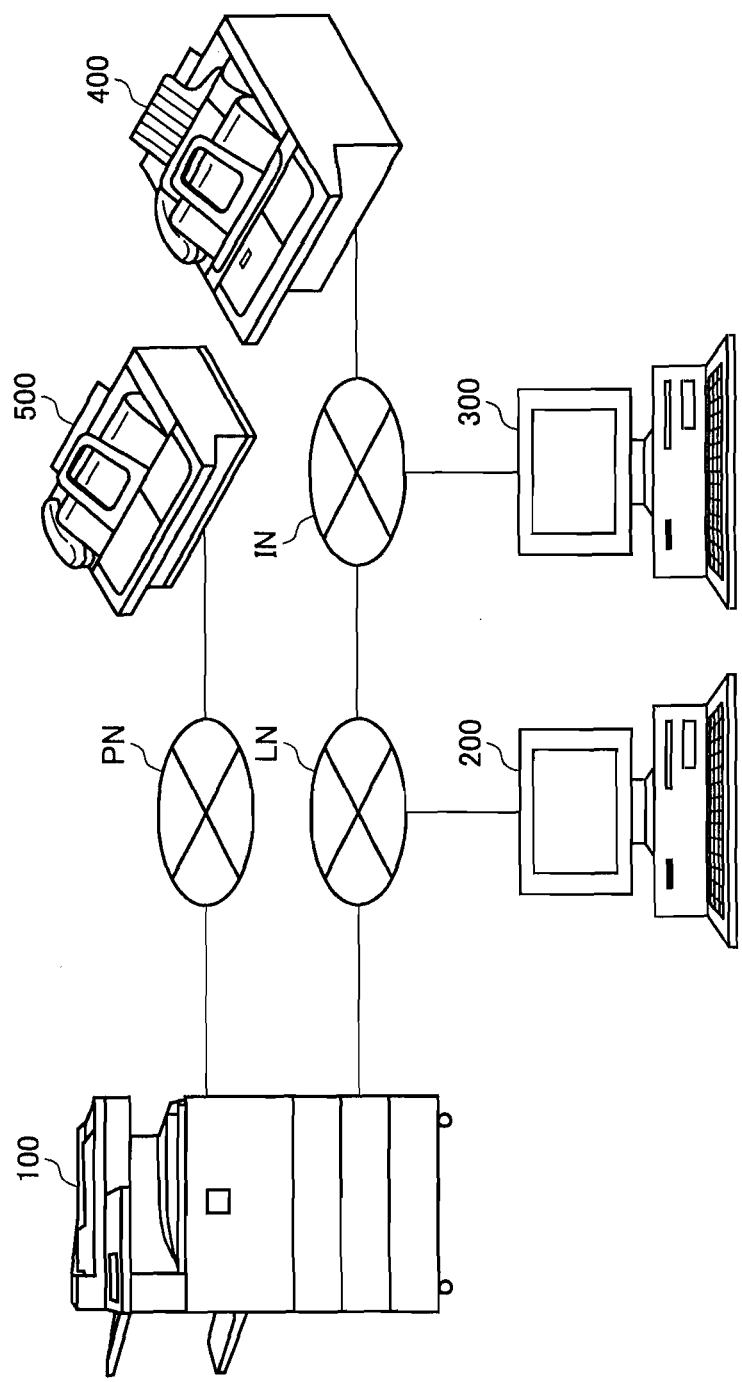
FIG. 1 is a schematic diagram of an overall configuration of an image processing system established with the use of a digital multi-function peripheral according to an embodiment of the present invention.

FIG. 1 is a schematic diagram of an overall configuration of an image processing system established with the use of a digital multi-function peripheral according to a first embodiment. In FIG. 1, the image processing system is configured by connecting a digital multi-function peripheral 100 through communication networks PN, LN, and IN with various external devices 200, 300, 400, and 500.

The communication network may be an internet network IN connecting through public lines or private lines to the outside, a network LN establishing a network within the same site, a public switched telephone network PN, or a combination thereof. The connection through wireless LAN may also be used of course.

The network LN is connected with an external computer 200 such as personal computer, and the internet network IN is connected through a gateway not shown, etc., and is connected with an external computer 300 and an internet facsimile apparatus 400. An external facsimile apparatus 500 is connected through the public switched telephone network PN.

(B) Hardware Configuration of Digital Multi-Function Peripheral

Figure 2:
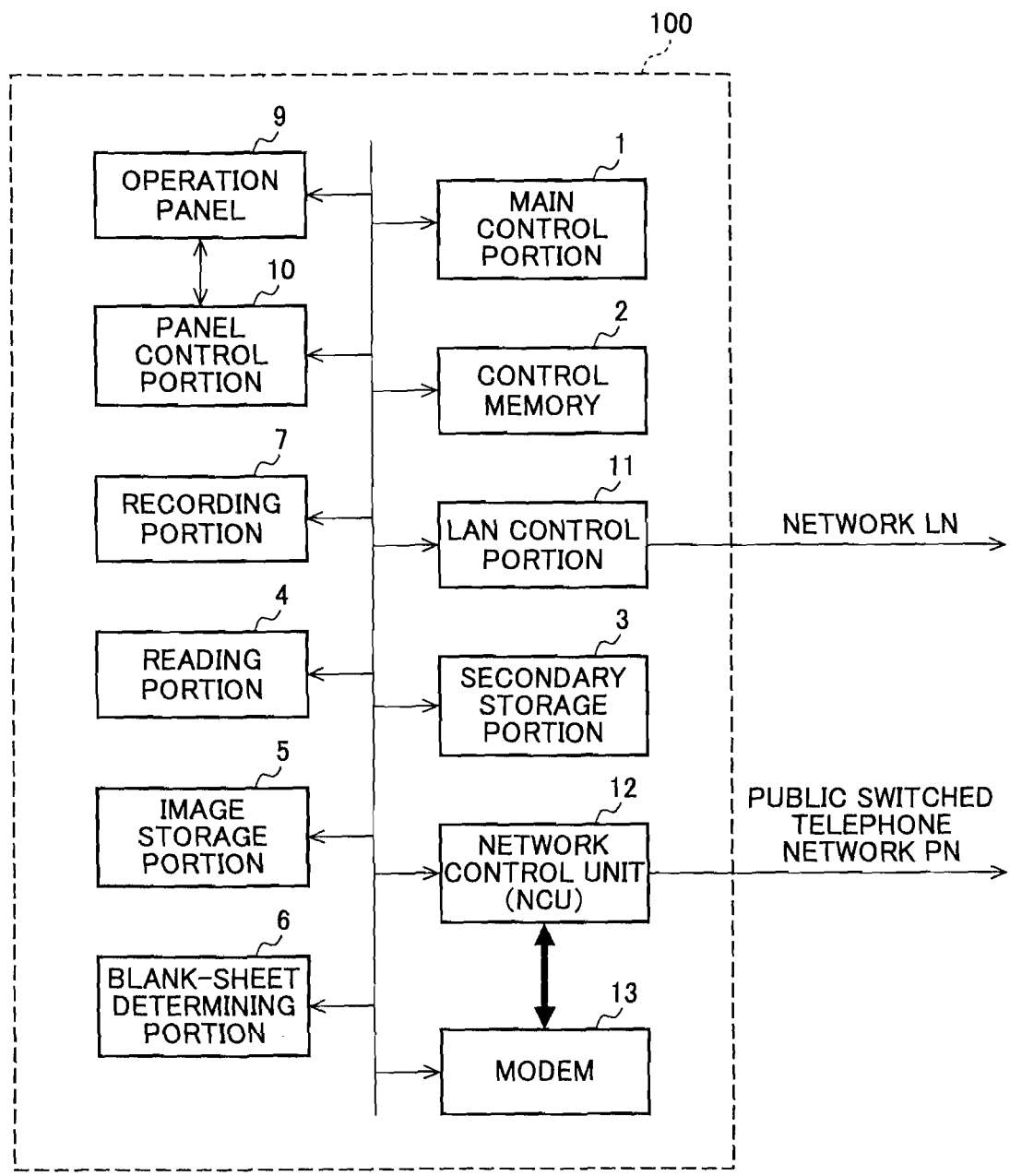
FIG. 2 is a schematic block diagram of a hardware configuration of the digital multi-function peripheral according to the embodiment.

FIG. 2 is a schematic block diagram of a hardware configuration of the digital multi-function peripheral 100 according to the embodiment. In FIG. 2, the digital multi-function peripheral 100 includes a main control portion 1, a control memory 2, a secondary storage portion 3, a reading portion 4, an image storage portion 5, a blank-sheet determining portion 6, a recording portion 7, an operation panel 9, a panel control portion 10, a LAN control portion 11, a network control portion 12, and a modem 13.

The main control portion 1 is embodied as CPU (central processing unit), etc., and executes a control program stored in the control memory 2 to generally control the digital multi-function peripheral 100.

The control memory 2 consists of a nonvolatile memory or a backed-up memory and stores the control program for controlling the digital multi-function peripheral 100, destination information, etc.

The secondary storage portion 3 is made up of RAM (random access memory), a hard disc, etc., and used for temporally data input/output in association with the execution of the control program.

The reading portion 4 includes a line sensor made up of an optical system such as CCD (charge-coupled device) and an automatic document carrying device not shown and reads a document placed on the automatic document carrying device as a document image with a predetermined resolution to store the resultant read document image data into the image storage portion 5. If a user gives an instruction for skipping blank sheets, the resultant read document image data and preview image data generated from the document image data are correlated and stored in the image storage portion 5.

The image storage portion 5 stores image data and is used as a buffer that temporarily stores data read from the reading portion 4, transmission/reception data for the external computers and facsimile apparatuses, and image data processed by the recording portion 7.

The recording portion 7 is an electrophotographic printer device and prints the document image data read by the reading portion 4 and the image data received from the external computers and facsimile apparatuses onto recording paper sheets.

The blank-sheet determining portion 6 uses a known technology to determine whether the document image data read by the reading portion 4 is that of a blank sheet and outputs the determination result. This determination is performed inside an effective image area (arbitrarily configurable) with left, right, upper, and lower margin sections of a document removed, instead of the entire document area.

In this embodiment, a "blank sheet" is defined as a document substantially having nothing written thereon after deleting the background color of the document and, for example, the blank-sheet determining portion 6 determines image data in the following states as a blank sheet:

(1) image data when reading a document substantially having nothing written thereon;

(2) image data read when reading the document of (1) with dust and dirt attached to a reading surface of a scanner;

(3) image data read when reading the document of (1) with dust and dirt attached thereto; and (4) image data including noise added when reading the document of (1).

For example of a known blank-sheet determining method, a document is determined as a blank sheet when the number of black pixels is not greater than a predetermined rate (threshold value) of a total number of pixels included in one page and is not determined as a blank sheet when the predetermined rate (threshold value) is exceeded. If a document includes a color image or a grayscale image, for example, the read document data is subjected to the binarizing process to perform the above determination.

Finally, the blank-sheet determining portion 6 outputs whether the document image is a "blank sheet" or "nonblank sheet" as the determination result.

Figure 3:
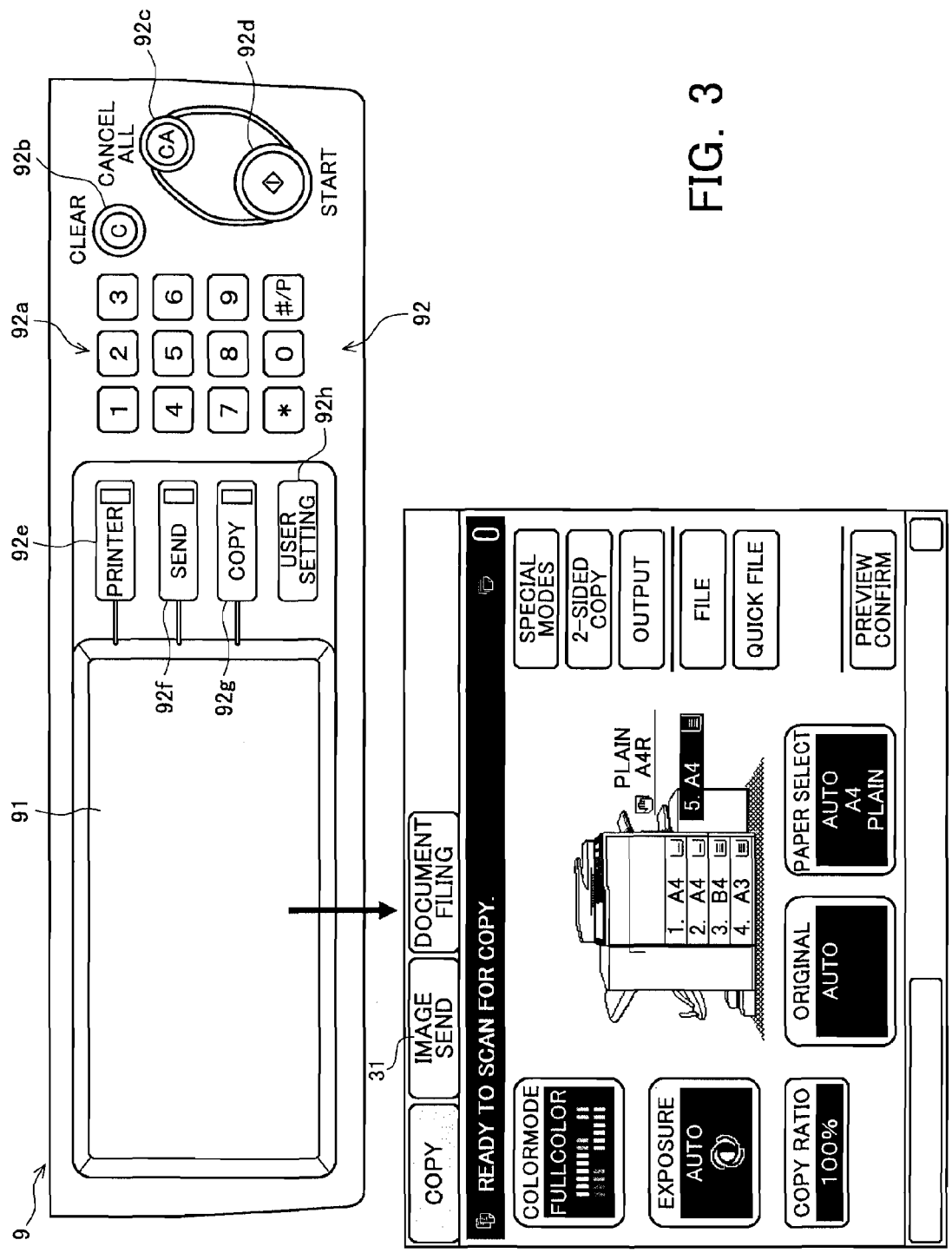
FIG. 3 is a diagram of an example of a basic screen of an initial screen displayed on an operation panel and a displaying portion.

The panel control portion 10 controls the display depending on input to the operation panel 9 and the display depending on instructions from the main control portion 1 and outputs the information input from the operation panel 9 to the main control portion 1. The operation panel 9 includes a displaying portion 91 and an operating portion 92 on the right side of the displaying portion 91 as exemplarily illustrated in FIG. 3.

The displaying portion 91 is made up of a liquid crystal panel, for example, and capable of performing the detailed guiding display of information to be supplied to a user. A transparent touch panel is provided on the screen of the liquid crystal panel to operate the touch panel in accordance with the information displayed on the liquid crystal panel. This touch panel is a constituent element of the operating portion 92 for entering instruction information to the apparatus.

The displaying portion 91 is in a standby state with a basic screen displayed in a "copy mode" as an initial screen. An external view of the apparatus is displayed in substantially the center area of the basic screen such that a system configuration (including configurations of a high-capacity paper feeding unit, a finisher unit, etc.) may visually be recognized. Information is also displayed for a selected mode, a selected paper feeding tray, image formation, etc.

The operating portion 92 is provided with keys disposed adjacently to the displaying portion 91 along with the touch panel and includes a numeric keypad 92*a* for entering numeric values, a clear key 92*b* for clearing the input set values, a cancel all key 92*c* for canceling all the various input settings, a start key 92*d* for giving an instruction for starting copy, transmission, etc., a switching key 92*e* for the print mode, a switching key 92*f* for the facsimile transmission mode, a switching key 92*g* for the copy mode, a user setting key 92*h* for accepting user's settings, etc.

The LAN control portion 11 is connected to the network LN to perform the e-mail data communication and the internet facsimile communication through the internet network IN.

The network control portion (NCU) 12 is hardware operating for closing and opening the line to the analog public switched telephone network (PSTN) PN and connects the modem 13 to the public switched telephone network PN as needed.

The modem 13 is made up of a facsimile modem capable of facsimile communication and connects from the network control portion 12 to the public switched telephone network PN to perform the facsimile communication.

A process procedure from reading to transmission/printing of documents will then be described. This process procedure forms a portion of the control program and is executed by the main control portion 1.

Figure 4B:
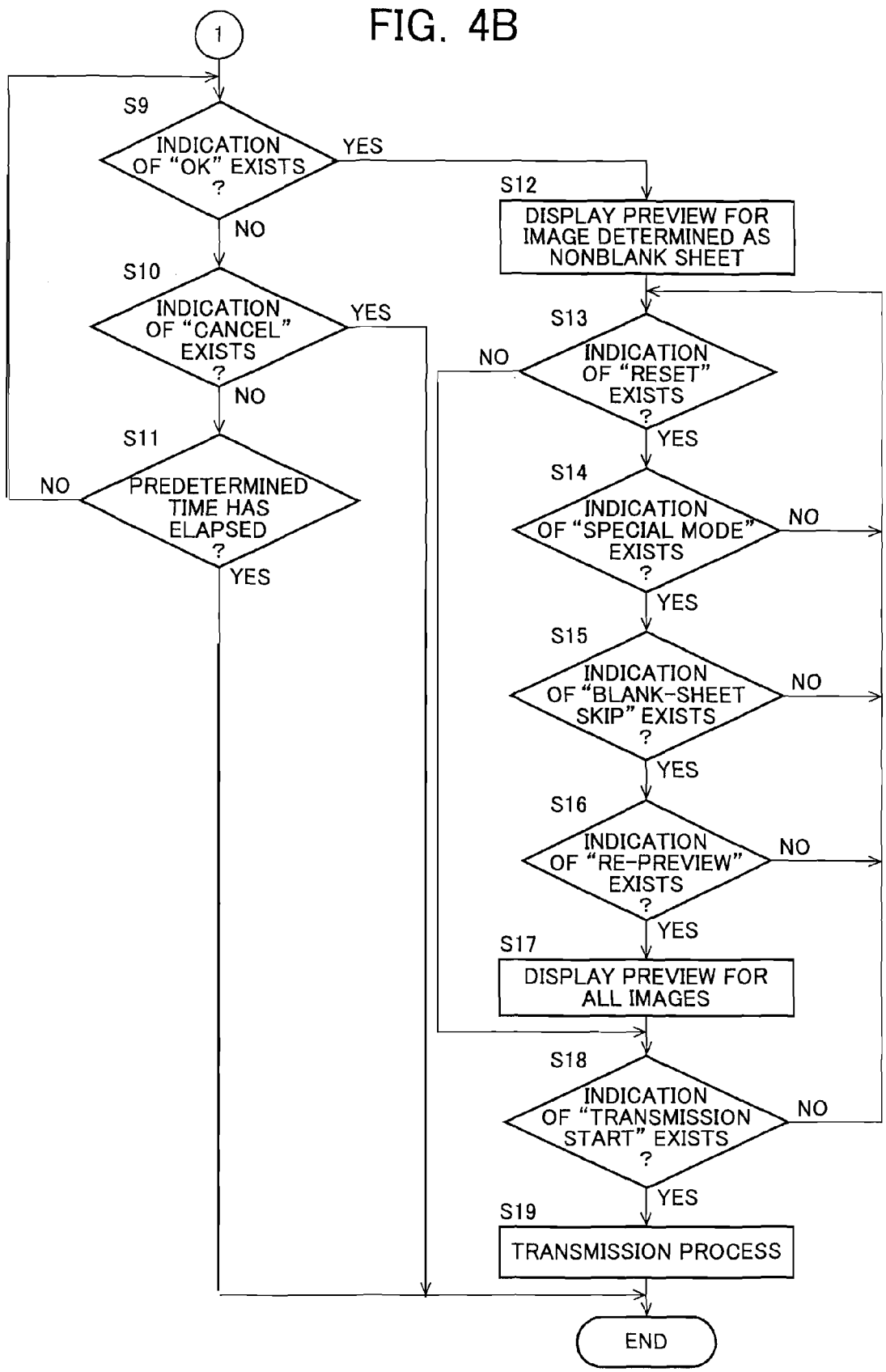

FIGS. 4A and 4B are explanatory flowcharts of a process procedure from reading to transmission of documents, taking facsimile transmission as an example.

A user sets documents to be transmitted on the automatic document carrying device, performs various settings for transmission, and presses the start key 92*d* (steps S1 to S5). The above operations are performed in the following procedure.

Figure 5:
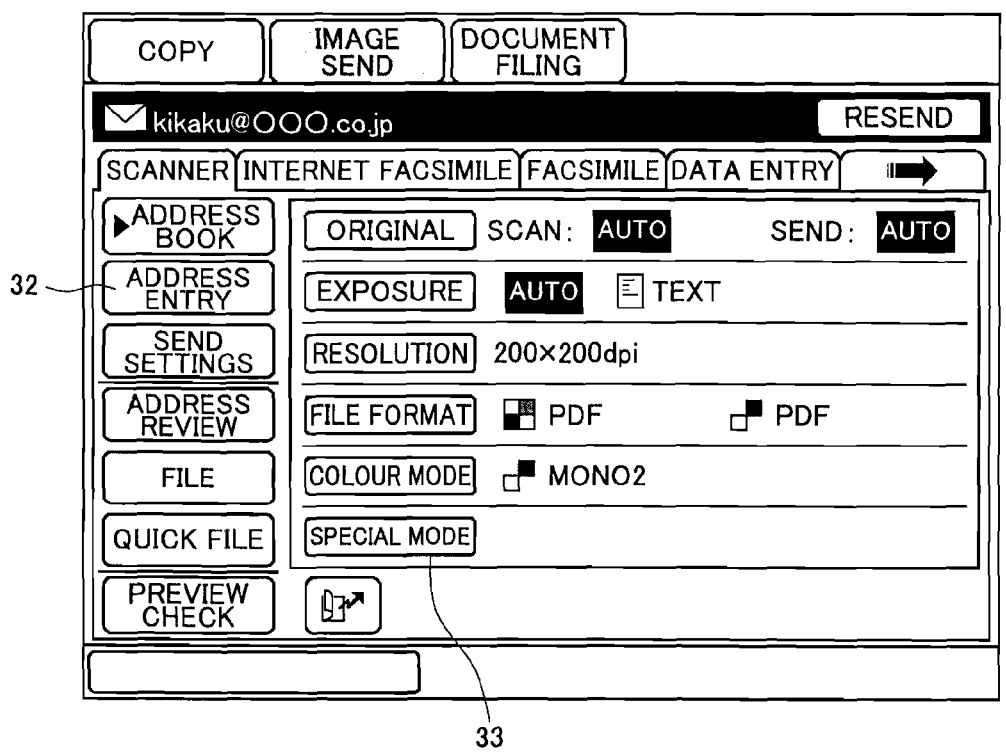
FIG. 5 is a diagram of an example of a basic screen of a transmission mode.

First, when an image send tab 31 is touched on the basic screen (FIG. 3) displayed on the displaying portion 91 of the operation panel 9 after setting the document, the displaying portion 91 displays the basic screen for the transmission mode (FIG. 5).

Figure 6:
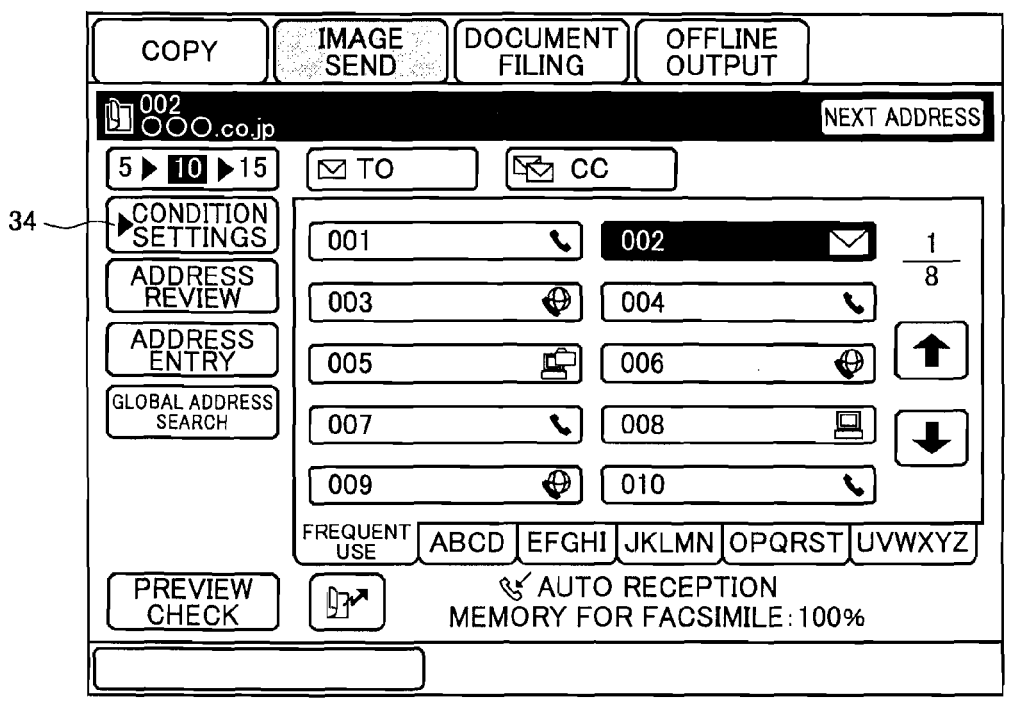
FIG. 6 is a diagram of an example of an address setting screen of the transmission mode.

After various settings are performed depending on a process type (such as scanner, internet facsimile, facsimile, and data input) on this basic screen for the transmission mode, an address setting screen is displayed (FIG. 6) by pushing an address input button 32, and when the destination address is input and a basic setting button is pushed, the screen returns to the basic screen for the transmission mode (FIG. 5).

Figure 7:
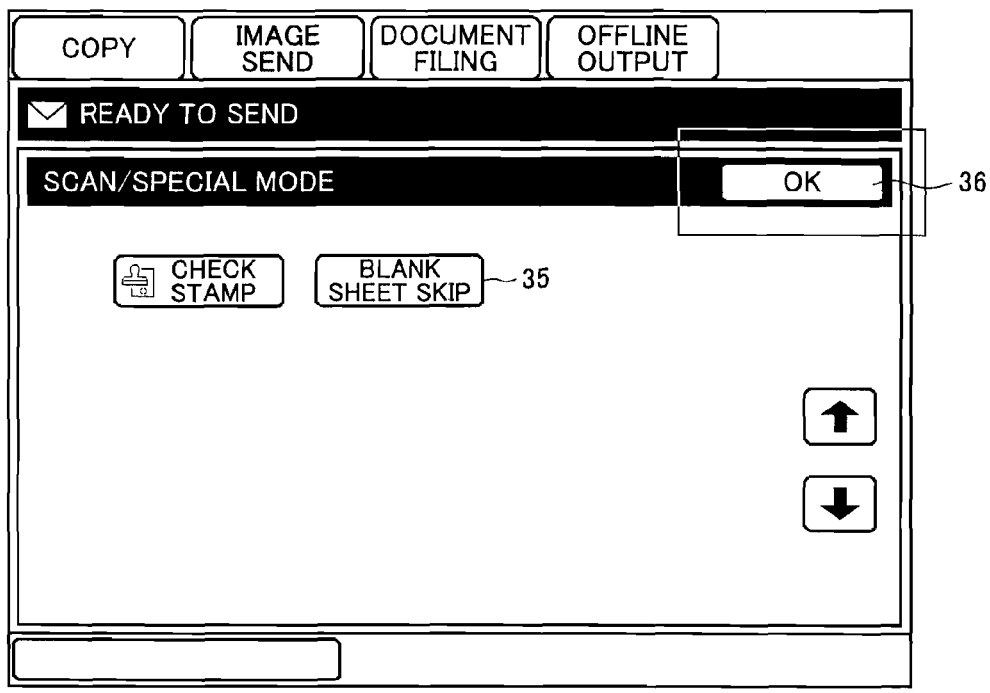
FIG. 7 is a diagram of an example of a setting screen of a special mode of the transmission mode.
Figure 8:
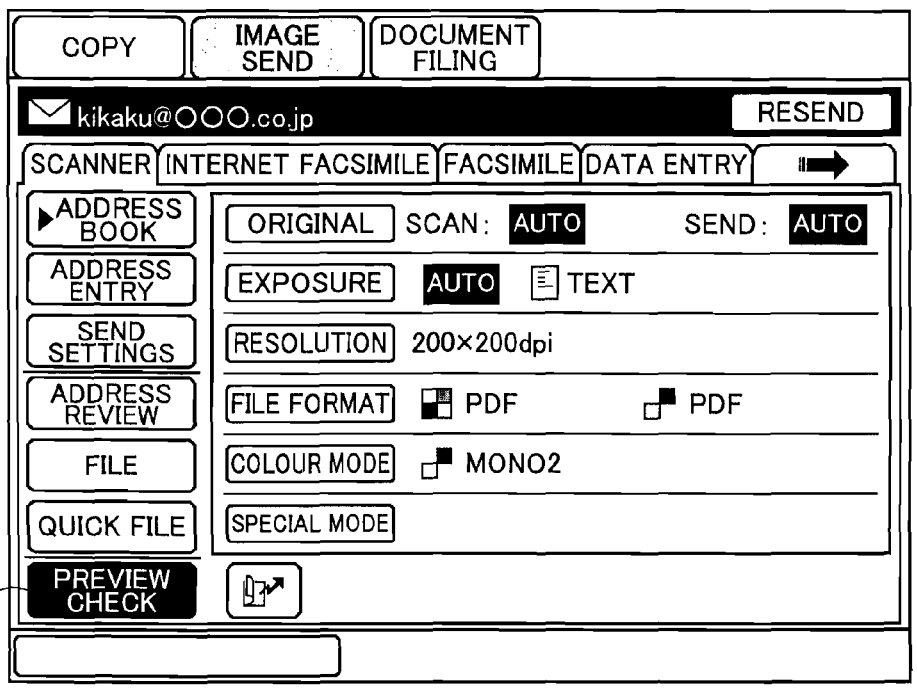
FIG. 8 is a diagram of an example of a screen when a preview check button is set.

A special mode screen is displayed by pushing a special mode button 33 in FIG. 5; a blank-sheet skip button 35 and an OK button 36 are pushed (FIG. 7); a preview check button 37 is pushed on the returned basic screen for the transmission mode (FIG. 8), and the start key 92*d* is pushed.

This starts the reading of the documents; a dialog message of "reading documents" is displayed on the displaying portion 91 (step S6); and a blank-sheet determining process and a preview generation process are executed (step S7). At step S7, the following process is executed for each read document.

Each time the reading potion 4 reads one page of the documents, the read document image data is given a file name and stored in the image storage portion 5; a thumbnail image of the read document image is generated, given a file name, and stored in the image storage portion 5; a preview table is constructed by correlating these file names with a page number and stored in the secondary storage portion 3.

The blank-sheet determining portion 6 then determines whether the read document image data is that of a blank sheet and the classification of "blank sheet" or "nonblank sheet" of this determination is correlated with the page number and stored in the preview table.

Figure 9:
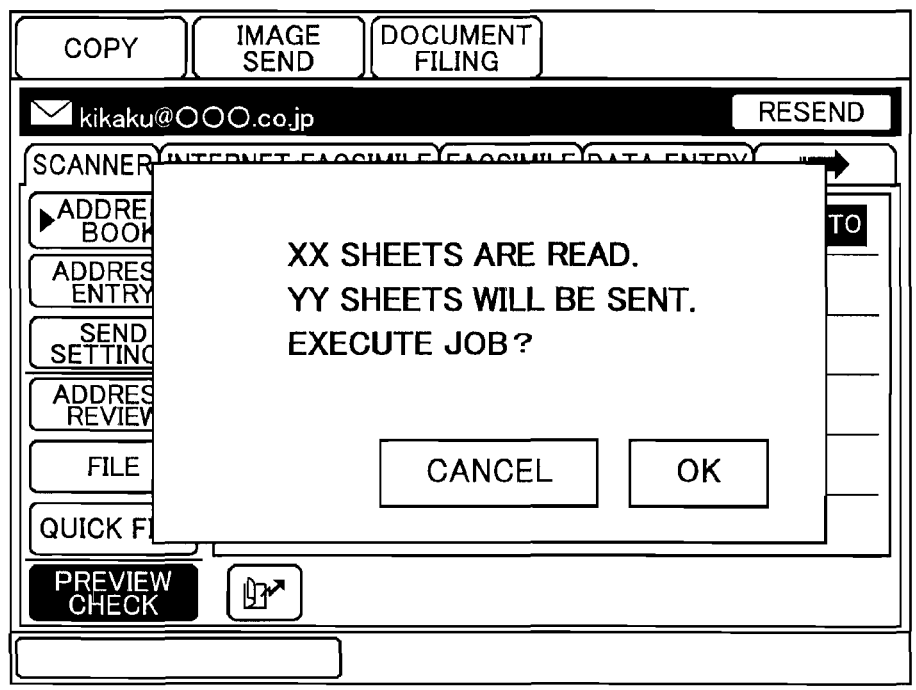
FIG. 9 is a diagram of an example of a message reporting the number of blank sheets.

After the process is completed for all the documents, the number of the read documents and the number of "nonblank sheets" are counted by reference to the classification in the preview table and when "the number of pages determined as nonblank sheets" is not zero, it is assumed that not all the read document images are blank sheets, and the displaying portion 91 displays a massage asking whether transmission is performed as shown in FIG. 9 (step S8).

In the above message, "the number of all the read pages and the number of pages determined as nonblank sheets" are displayed on the displaying portion 91.

By watching the displayed message, the user may easily recognize whether a blank page exists.

Alternatively, if the user comprehends the number of document pages, only "the number of pages determined as nonblank sheets" may be displayed on the displaying portion 91.

Figure 10:
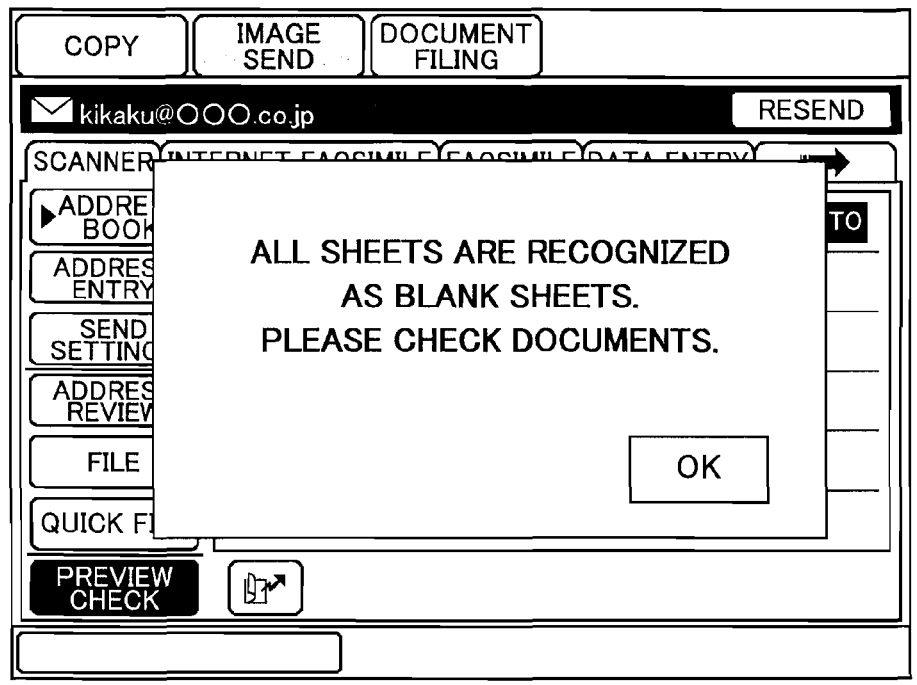
FIG. 10 is a diagram of an example of a message reporting that all the documents are blank sheets.

If "the number of pages determined as nonblank sheets" is zero, it is assumed that all the read document image data are determined as blank sheets and since the documents have a high possibility of being set upside down, the displaying portion 91 displays a massage as shown in FIG. 10 ("All documents are recognized as blank sheets. Please check documents") and returns to the basic screen for the transmission mode (FIG. 5) with the settings maintained. Since the user may only reset the documents and push the start key 92d in this case, an effort to reenter the settings is eliminated.

By watching this message, the user may easily recognize the possibility of documents being set upside down and may easily perform subsequent operations.

While pushing down of the OK button or the cancel button of the dialog is monitored, if it is detected that the OK button is pushed (YES at step S9), the procedure goes to step S12.

If it is detected that the cancel button is pushed (YES at step S10), the transmission process is terminated and the screen returns to the basic screen for the transmission mode (FIG. 5).

If neither the OK button nor the cancel button is pushed after a predetermined time (e.g., 60 seconds) has elapsed (YES at step S11), the transmission process is terminated and the screen returns to the basic screen for the transmission mode (FIG. 5). Since this is the case that the user cannot make a judgment and the erroneous setting of documents or the erroneous judgment of blank sheets may be considered, waste printing and communication cost due to erroneous transmission are generated by the transmission and this may effectively be prevented by the above operation.

Figure 11:
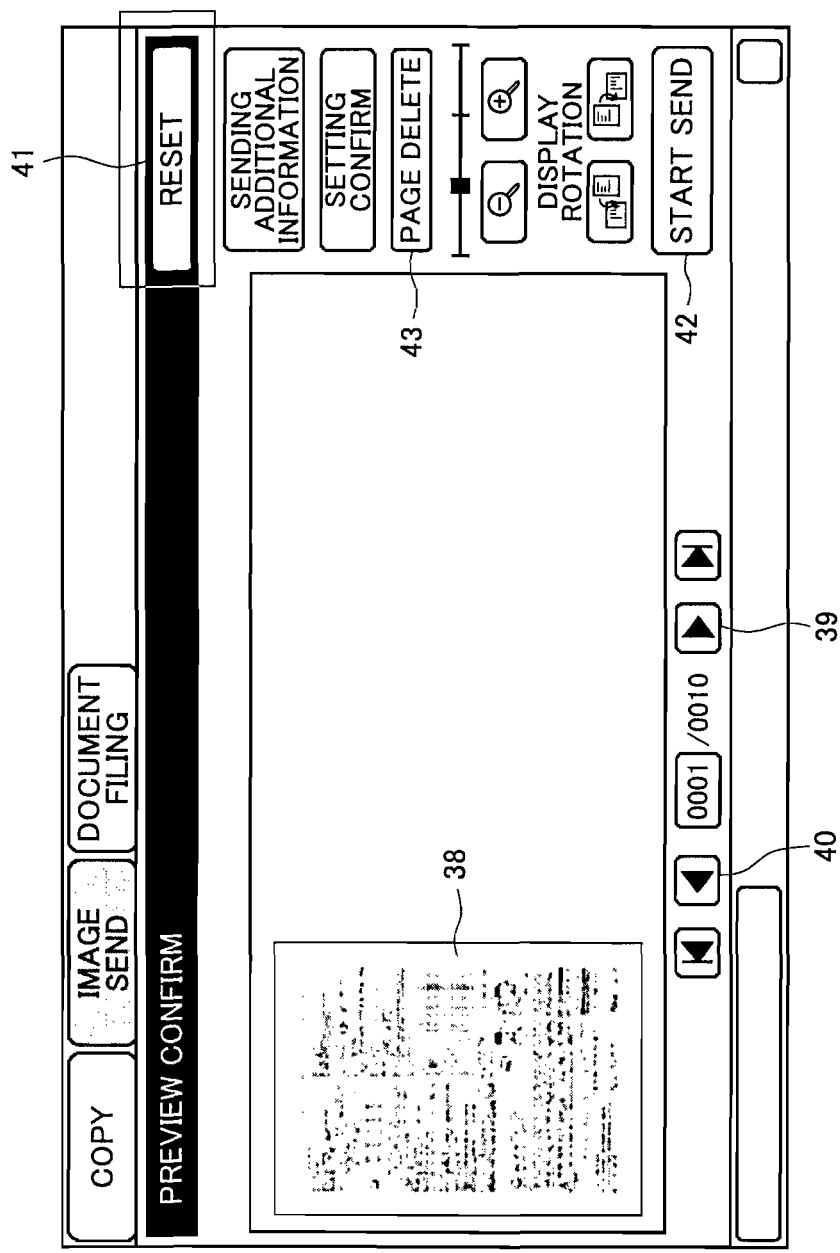
FIG. 11 is a diagram of an example of a preview screen.

If it is detected that the "OK" button is pushed, the screen is automatically switched to the preview check screen and a preview screen as shown in FIG. 11 is displayed with the use of a thumbnail image 38 consisting of pages classified as "nonblank sheets" only (step 12). The thumbnail image 38 of the pages determined as nonblank sheets may sequentially be displayed by pushing a forward button 39/a backward button 40.

Figure 12:
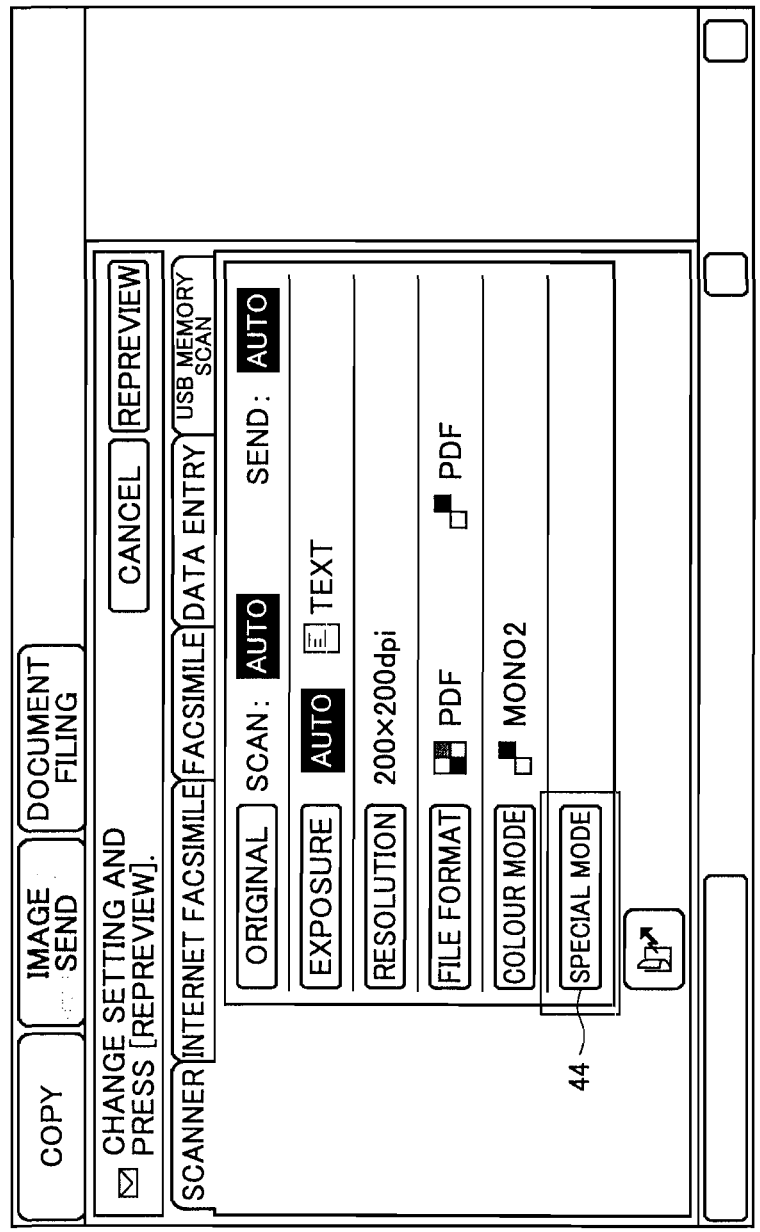
FIG. 12 is a diagram of an example of a reset screen when a reset button is pushed.
Figure 13:
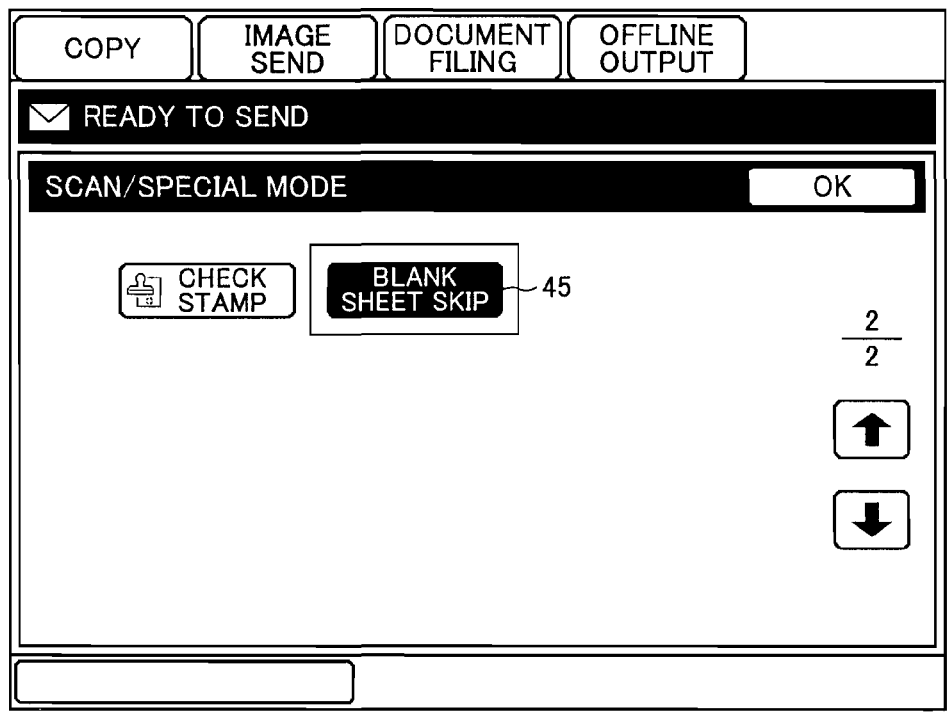
FIG. 13 is a diagram of an example of screen for canceling a "blank-sheet skip" function when a special mode button is pushed.
Figure 14:
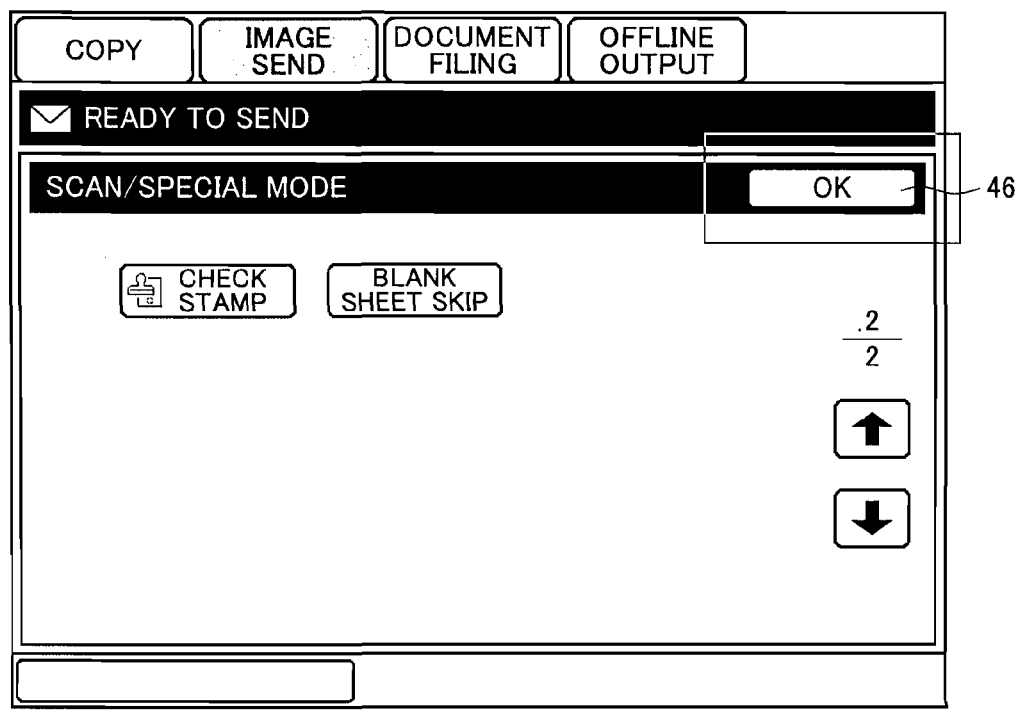
FIG. 14 is a diagram of an example of a screen when the blank-sheet skip function is cancelled.
Figure 15:
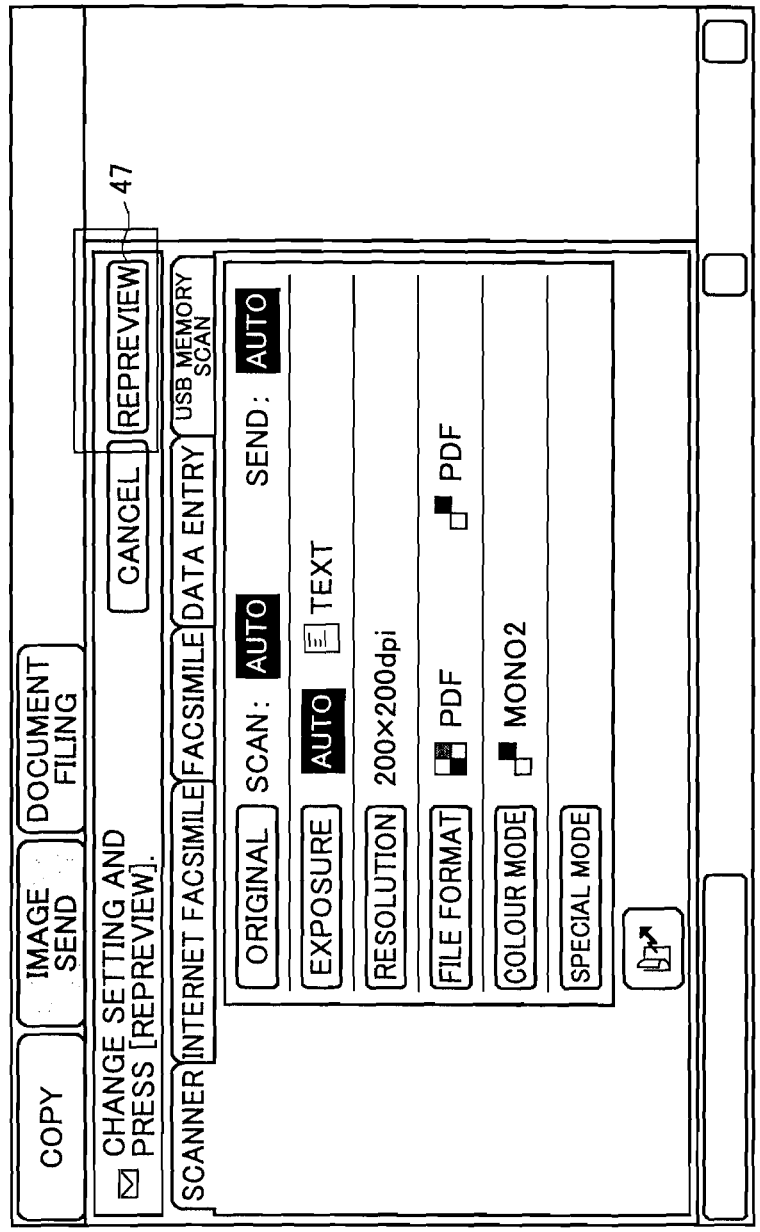
FIG. 15 is a diagram of an example of a screen when re-preview is pressed down.

If it is detected that a reset button 41 is pushed (YES at step S13), a screen exemplarily illustrated in FIG. 12 is displayed; if it is detected that a special mode button 44 is pushed (YES at step S14), a screen exemplarily illustrated in FIG. 13 is displayed; if it is detected that a blank-sheet skip button 45 is pushed (YES at step S15), the "blank-sheet skip" function is canceled as exemplarily illustrated in FIG. 14; if it is detected that an OK button 46 is pushed, a screen exemplarily illustrated in FIG. 15 is displayed; if it is detected that a re-preview button 47 is pushed (YES at step S16), the screen is switched to a screen of FIG. 11; and if it is detected that a user pushes the forward button 39/the backward button 40, the thumbnail image 38 is sequentially displayed for all the read pages (step S17).

If it is detected that a transmission start button 42 is pushed (YES at step S18), the document image data read based on the currently selected "blank-sheet skip" function is transmitted (step S19). If the "blank-sheet skip" function is effective, only the document image data determined as nonblank sheets is transmitted and if the "blank-sheet skip" function is canceled, all the read document image data are transmitted including the document image data determined as blank sheets.

This transmission function may be implemented with the use of the facsimile communication function or the e-mail transmission function through the internet facsimile communication.

Although an example of applying the present invention to the facsimile communication process has been described above, the present invention is similarly applicable to the printing process.

The printing process is executed in the same way at all steps if the destination setting at step 2 is removed and that the transmission process at step S19 is replaced with the printing process in the flowchart of FIG. 4 and, therefore, will not be described.

<Second Embodiment>

Although all the documents of above (1) to (4) are defined as blank sheets in the first embodiment described above, the determination as a blank sheet is made only for an image with the backside of document showed through or including an image with the backside of document showed through in a second embodiment.

When one side of a two-sided document is printed or facsimiled if a document having only one side printed (e.g., a front cover, a sheet to be combined, a back cover) is mixed, the backside of document is showed through and, therefore, this embodiment is used to remove the document page.

Known methods of determining an image with the backside of document showed through include methods described in Japanese Laid-Open Patent Publication Nos. 08-340447 and 2002-77606. For example, a blank sheet with the backside of document showed through may be determined when density values of all pixels of a document image are smaller than a predetermined threshold value.

If only the image with the backside of document showed through is defined as a blank sheet, the blank-sheet determining portion 6 classifies a document image into either the "image with the backside of document showed through" or the "nonblank sheet" and outputs this classification as a determination result. If both the blank sheet and the image with the backside of document showed through are defined as a blank sheet, the blank-sheet determining portion 6 classifies a document image into either the "blank sheet or image with the backside of document showed through" or the "nonblank sheet" and outputs this classification as a determination result.

The reading portion 4 stores the read document image data, the thumbnail image, the determination result into the preview table by correlating these data with the page number.

When performing the preview display for the first time, only the thumbnail images 38 of the pages determined as the "nonblank sheets" are displayed and when the re-preview button 47 is pushed to cancel the "blank-sheet skip" function, the thumbnail images 38 of all the read document images are displayed (FIG. 11).

Alternatively, when performing the preview display, the thumbnail images 38 may be displayed for only the pages determined as the "blank sheets" and if the "blank-sheet skip" function is canceled when the re-preview button 47 is pushed, the thumbnail images 38 of all the read document images may be displayed.

As above, if it is determined that the read document images include a blank sheet or an image with the backside of document showed through before executing the output process of the read document images, the preview display may be performed to allow a user to check the read contents.

<First Variation>

Although the pages determined as the "nonblank sheets" are displayed when the preview display is performed for the first time and all the pages are displayed when the "blank-sheet skip" function is canceled in the above first and second embodiments, the pages determined as the "blank sheets (including images with the backside of document showed through)" may be displayed when the preview display is performed for the first time and all the pages may be displayed when the "blank-sheet skip" function is canceled in a first variation.

By configuring the first variation as above, if it is determined that the read document images include a blank sheet, the preview display may be performed to check the read contents.

In this case, whether the discrimination from the "blank sheet" is correctly judged may quickly be checked by first performing the preview display of the pages determined as the "blank sheets".

<Second Variation>

In the above embodiments and the first variation, a selection is made such that either all or none of the pages determined as the blank sheets (including images with the backside of document showed through) are deleted.

However, the pages determined as the blank sheets (including images with the backside of document showed through) are likely to include those correctly determined or erroneously determined.

In a second variation, when the output process is executed by pushing a page deletion button 43 of FIG. 11 while the "preview" or "re-preview" is performed, the document image data corresponding to the previewed thumbnail image 38 is deleted. At the time of deletion, a dialogue for confirming the deletion may be displayed.

<Third Variation>

Although the preview display is performed if the blank-sheet skip button and the preview check button are pushed in the first and second variations, the preview display is always performed if the blank-sheet skip button is pushed in a third variation.

In this case, if step S2 is omitted and the "blank-sheet skip" function is selected at step S4 in the flowchart of FIG. 4, the preview check, i.e., the preview display is automatically performed.

The present invention is not limited to the above embodiments and various alterations and modifications may be made thereto without departing from the scope of the present invention.

According to the present invention, if it is determined that the read document images include a blank sheet before executing the output process of the read document images, the preview display may be performed to allow a user to check the read contents.

The invention claimed is:

1. A document reading device comprising:
   a document reading portion;
   a blank-sheet determining portion that determines blank-sheet image data among document image data read by the document reading portion;
   a preview displaying portion that performs preview display for the document image data excluding the blank-sheet image data determined by the blank-sheet determining portion, the preview displaying portion being capable of performing re-preview display, the re-preview display being carried out so as to display all of the document image data excluding the blank-sheet image data if a blank sheet skip instruction is activated, and the re-preview display being carried out so as to display all of the document image data including the blank-sheet image data if the blank-sheet skip instruction is canceled; and
   a show-through determining portion that determines whether the document image data is image data of a backside of a document shown through, and if so, the image data of the backside of the document shown through is processed as the blank-sheet image data.

2. A document reading device sequentially reading and recording documents and having a blank-sheet determining portion that determines image data of a blank sheet among read document image data, comprising:
   a blank-sheet skipping portion that determines whether each of the sequentially read document image data is blank-sheet image data to correlate and store the document image data with the determination result in accordance with a blank-sheet skip instruction, and performs preview display for the document image data determined as nonblank-sheet image data after all the document images are read;
   a blank-sheet skip canceling portion that performs preview display of all the read document image data in accordance with cancellation of the blank-sheet skip instruction;
   an output portion that skips the document image data determined as blank-sheet image data to output the read document image data if the blank-sheet skip instruction is effective, and outputs all the read document image data if the blank-sheet skip canceling instruction is effective; and
   a show-through determining portion that determines whether the document image data is image data of a backside of a document shown through, and if so, the image data of the backside of the document shown through is processed as the blank-sheet image data.

3. A document reading device sequentially reading and recording documents and having a blank-sheet determining portion that determines image data of a blank sheet among read document image data, comprising:
   a blank-sheet skipping portion that determines whether each of the sequentially read document image data is blank-sheet image data to correlate and store the document image data with the determination result in accordance with a blank-sheet skip instruction, and performs preview display for the document image data determined as blank-sheet image data after all the document images are read;
   a blank-sheet skip canceling portion that performs preview display of all the read document image data in accordance with cancellation of the blank-sheet skip instruction;
   an output portion that skips the document image data determined as blank-sheet image data to output the read document image data if the blank-sheet skip instruction is effective, and outputs all the read document image data if the blank-sheet skip canceling instruction is effective; and a show-through determining portion that determines whether the document image data is image data of a backside of a document shown through, and if so, the image data of the backside of the document shown through is processed as the blank-sheet image data.

4. The document reading device as defined in claim 2 or 3, wherein after all the document images are read, the number of all the read document image data and the number of the document image data determined as nonblank-sheet image data are displayed.

5. The document reading device as defined in claim 2 or 3, wherein after all the document images are read, the number of the document image data determined as nonblank-sheet image data is displayed.

6. The document reading device as defined in claim 2 or 3, wherein after all the document images are read, the number of all the read document image data and the number of the document image data determined as nonblank-sheet image data are displayed and wherein if the display of the numbers of data is not terminated after a predetermined time has elapsed, a subsequent process is canceled.

7. The document reading device as defined in claim 2 or 3, wherein after all the document images are read, the number of the document image data determined as nonblank-sheet image data are displayed and wherein if the display of the number of data is not terminated after a predetermined time has elapsed, a subsequent process is canceled.

8. The document reading device as defined in claim 2 or 3, wherein after all the document images are read, if all the document image data are determined as blank-sheet image data, an alert message is displayed without performing the preview display.

9. The document reading device as defined in claim 2 or 3, wherein among all the read document image data displayed in the preview display, document image data instructed to be deleted is deleted from the read document image data to be output.

* * * * *